US009971134B2

(12) United States Patent
Vissenberg et al.

(10) Patent No.: US 9,971,134 B2
(45) Date of Patent: May 15, 2018

(54) LIGHTING DEVICE WITH VIRTUAL LIGHT SOURCE

(71) Applicant: PHILIPS LIGHTING HOLDING B.V., Eindhoven (NL)

(72) Inventors: Michel Cornelis Josephus Marie Vissenberg, Eindhoven (NL); Johannes Petrus Maria Ansems, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days. days.

(21) Appl. No.: 15/326,915

(22) PCT Filed: Jul. 7, 2015

(86) PCT No.: PCT/EP2015/065406
§ 371 (c)(1),
(2) Date: Jan. 17, 2017

(87) PCT Pub. No.: WO2016/012226
PCT Pub. Date: Jan. 28, 2016

(65) Prior Publication Data
US 2017/0212338 A1 Jul. 27, 2017

(30) Foreign Application Priority Data
Jul. 21, 2014 (EP) .................................... 14177754

(51) Int. Cl.
*F21V 1/00* (2006.01)
*F21V 11/00* (2015.01)
(Continued)

(52) U.S. Cl.
CPC ............ *G02B 17/026* (2013.01); *F21K 9/232* (2016.08); *F21V 5/02* (2013.01); *F21V 5/04* (2013.01); *F21V 5/043* (2013.01)

(58) Field of Classification Search
CPC ... F21K 9/232; F21K 9/66; F21K 9/68; F21K 9/69; F21V 5/02; F21V 5/04; F21V 5/043; F21V 5/046; G02B 17/026
See application file for complete search history.

(56) References Cited

U.S. PATENT DOCUMENTS 8,410,699 B2 4/2013 Chih-Ming
2004/0085766 A1 5/2004 Chen et al.
(Continued)

FOREIGN PATENT DOCUMENTS

CN 102261568 A 11/2011
EP 2367045 A1 9/2011
(Continued)

*Primary Examiner* — Alexander Garlen

(57) ABSTRACT

A lighting device (1) is provided comprising a base (5), at least one light source (4) arranged at the base, at least one light transmissive optical element (7), and a light transmissive envelope (6) arranged to cover the at least one light source and the at least one optical element. At least a portion of the at least one optical element has a thickness (D) increasing in direction towards the base such that the at least one optical element refracts light emitted by the at least one light source for creating at least one virtual light source (8) spaced from the base. The present aspect is advantageous in that each one of the envelope and the optical element may be manufactured separately, e.g. by standard injection molding technique.

11 Claims, 5 Drawing Sheets

(51) Int. Cl.

| | |
|---|---|
| ***G02B 17/02*** | (2006.01) |
| ***F21K 9/232*** | (2016.01) |
| ***F21V 5/04*** | (2006.01) |
| ***F21V 5/02*** | (2006.01) |

(56) References Cited

U.S. PATENT DOCUMENTS

| | | | | |
|---|---|---|---|---|
| 2007/0139932 | A1 | 6/2007 | Sun et al. | |
| 2010/0208456 | A1* | 8/2010 | Huang | F21V 5/04 362/231 |
| 2010/0327745 | A1 | 12/2010 | Dassanayake et al. | |
| 2012/0020092 | A1 | 1/2012 | Bailey | |
| 2012/0044696 | A1* | 2/2012 | Hsueh | F21V 3/00 362/296.01 |
| 2012/0163001 | A1 | 6/2012 | Bertram et al. | |
| 2012/0320580 | A1 | 12/2012 | Liang | |
| 2013/0027926 | A1* | 1/2013 | Chiu | F21V 3/00 362/235 |
| 2013/0242567 | A1* | 9/2013 | Ariyoshi | F21V 5/04 362/311.02 |
| 2014/0198506 | A1* | 7/2014 | Chen | F21V 13/04 362/293 |

FOREIGN PATENT DOCUMENTS

| | | | |
|---|---|---|---|
| JP | 2008159453 | A | 7/2008 |
| JP | 2011009021 | A | 1/2011 |
| WO | WO2013054693 | A1 | 4/2013 |
| WO | WO2013190979 | A1 | 12/2013 |

* cited by examiner

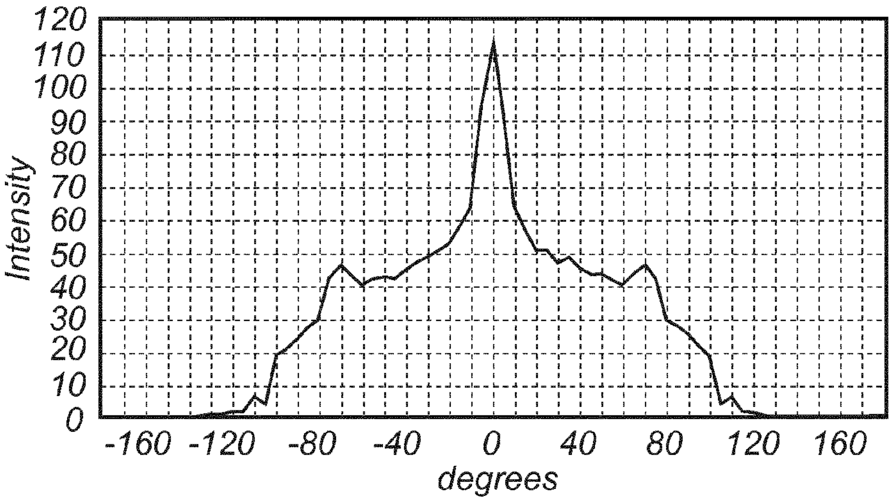
Fig. 6
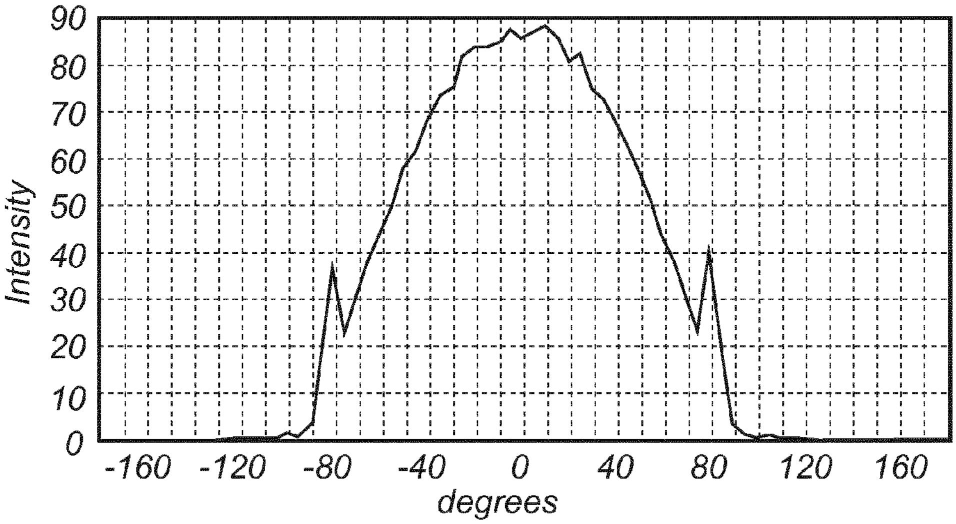
Prior art Fig. 7

LIGHTING DEVICE WITH VIRTUAL LIGHT SOURCE

CROSS-REFERENCE TO PRIOR APPLICATIONS

This application is the U.S. National Phase application under 35 U.S.C. § 371 of International Application No. PCT/EP2015/065406, filed on Jul. 7, 2015, which claims the benefit of European Patent Application No. 14177754.0, filed on Jul. 21, 2014. These applications are hereby incorporated by reference herein.

FIELD OF THE INVENTION

The present invention generally relates to the field of lighting devices. In particular, the present invention relates to lighting devices able to provide a virtual light source.

BACKGROUND OF THE INVENTION

Traditional incandescent lighting devices have a natural omnidirectional light spreading since the upper portion of the filament is spaced from the screw base of the lighting device. Consequently, light is emitted not just forwardly and laterally, but also backwardly. Conventional solid state based lighting devices, such as light emitting diode (LED) based lighting devices, has a more directed light spreading compared to such incandescent lighting devices since the light source (such as the LED) is itself flat and is normally attached to the base of the lighting device for providing sufficient heat dissipation from the light source via the heat sink arranged at the base. Therefore, the light spreading pattern of LEDs is normally of the Lambertian type, which means that light is emitted mainly forwardly from the lighting device.

In order to resemble the more omnidirectional light spreading of a traditional incandescent lighting device, solid state based lighting devices may comprise a light guide for guiding light emitted by the light source and emit it from a position remote from (such as above) the base of the lighting device. Another alternative is to provide an optical feature for creating a virtual light source above the real light source, e.g. by redirecting and/or refracting light from the light source. Thus, the virtual light source is spaced from the base of the lighting device and therefore spreads light in lateral and backward directions. An example of such a lighting device is shown in US 20120320580 A1. A drawback with such a lighting device is that the optical cover (or envelope) comprising the optical feature for refracting light may be complicated and expensive to manufacture.

SUMMARY OF THE INVENTION

It would be advantageous to achieve a lighting device overcoming, or at least alleviating, the above mentioned drawbacks. In particular, it would be desirable to enable a lighting device, which is less complicated and less expensive to manufacture.

To better address one or more of these concerns, a lighting device having the features defined in the independent claim is provided. Preferable embodiments are defined in the dependent claims.

Hence, according to an aspect, a lighting device is provided. The lighting device comprises a base, at least one light source arranged at the base, at least one light transmissive optical element, and a light transmissive envelope arranged to cover the at least one light source and the at least one optical element. At least a portion of the at least one optical element has a thickness increasing in direction towards the base, said portion being arranged laterally beside the optical axis of the at least one light source so as to refract light emitted by the at least one light source for creating at least one virtual light source spaced from the base.

The optical element provides a negative lens action and refracts light emitted (in particular in lateral directions) by the at least one light source away from an optical axis of the lighting device, i.e. more towards a backward direction of the lighting device. As a consequence, a virtual light source appears, which is spaced from (such as above) the base (e.g. between the light source and the envelope). As the virtual light source is spaced from the base, the light intensity is increased in the lateral and backward directions, which creates a more omnidirectional light spreading of the lighting device.

In the context of this invention, under a virtual light source is to be understood an image of the physical light source. This can be realized by a lens that creates this image. Further, this image does not need to be an exact image, it may be deformed or blurred to some extent. The essential part of this virtual light source is that it seems that a light source is positioned somewhere in the lighting device, but that it is not physically present at that position. In the sense of this invention a scattering output surface from e.g. a light guide is not considered to be a virtual light source, for this does not represent an image of the real light source.

Further, as the (real) light source is arranged at the base, heat dissipation from the light source can be facilitated, as the base may interface e.g. a heat sink of the lighting device or the ambient air. Further, the present aspect enables using several and/or larger light sources without the optical element necessarily getting more bulky, as the portion with increasing thickness is arranged laterally beside the optical axis of the light source instead of on (or above) the light source. In contrast, conventional solutions having a light guide coupled to the light source for guiding light away from the base get more bulky with increased size and/or number of light sources, as the light guide must be made larger due to the larger output surface of the light sources. Hence, the present aspect is less light source dependent compared to such conventional solutions. Further, the present aspect is advantageous in that the amount of light being reflected back towards the light source is reduced, which is a common issue with conventional light guide based solutions. Hence, the efficiency of the lighting device is increased.

In order to achieve more space between the virtual light source and the base and, thus, an improved omnidirectional light spreading, the variation in thickness of the light refracting optical feature needs to be rather significant. Having merely an envelope with a thickness strongly increasing towards the base (and no optical element), the envelope may be hard to released from an injection mold for molding the envelope. Hence, more complicated injection molding techniques are required in order to achieve a larger variation in the thickness. Such injection molding techniques may include e.g. using a mold with collapsible core, using a silicone envelope that can be deformed during release from the mold or using glass blowing. The present aspect is advantageous in that each one of the envelope and the optical element may be manufactured separately, e.g. by standard injection molding technique, which is less complicated and less expensive than the above described injection molding techniques. Hence, a standard envelope may be used in combination with an optical element having a varying thickness.

In the present specification, a lateral direction may be any direction crossing (such as being substantially perpendicular to) the optical axis of the at least one light source. The optical axis of the at least one light source may coincide with the optical axis of the lighting device.

It will be appreciated that the virtual light source may not necessarily be a perfect image of the real light source. The virtual light source may e.g. be deformed, blurred or split up into multiple virtual images at different positions.

In the present specification, the term "base" may e.g. include a support surface in the lighting device for supporting the light source and optionally also the optical element and/or the envelope. Further, the optical element and the envelope being light transmissive may include that they are e.g. transparent or translucent. The portion of the optical element having a thickness increasing towards the base may e.g. include that the portion of the optical element has a cross-section being tapered in a direction away from the base.

According to an embodiment, the at least one optical element and the envelope may be separate (or distinct) parts. Preferably, they may be manufactured separately. When assembled in the lighting device, they may or may not be interconnected. Hence, they may be mounted separately in the lighting device, or they may be joined (e.g. glued) to each other prior to being mounted in the lighting device.

According to an embodiment, the at least one optical element may be (directly or indirectly) coupled to the base and extend in a direction away from the base. For example, the optical element may be arranged such that one or more portions with thicknesses increasing towards the base are located laterally beside the at least one light source on the base.

According to an embodiment, the envelope may have a (substantially) uniform thickness, such as less than 10% variation in the thickness. For example, the envelope may be a standard envelope component, which facilitates manufacturing of the lighting device. This is rendered possible since the variation in thickness for achieving the desired refraction of light is provided in the optical element. Alternatively, the envelope may have a thickness slightly increasing towards the base so as to increase the light refracting effect. Preferably, such a variation in thickness of the envelope may be sufficiently small to allow using standard injection molding techniques for forming the envelope.

According to an embodiment, the thickness of the portion of the at least one optical element may increase continuously towards the base, whereby irregularities in the light intensity distribution is reduced. Hence, the portion of the optical element may have cross-section being continuously tapered in direction away from the base. The thickness of the portion of the optical element may e.g. be linearly or non-linearly increasing towards the base.

Various shapes of the optical element with a varying thickness may be envisaged for achieving the desired light refracting effect. Some examples of such shapes will be described in the following.

In an embodiment, the at least one optical element may comprise an additional envelope arranged to cover the at least one light source and having a thickness increasing in direction towards the base. Hence, the additional envelope (of the optical element) may be arranged on the inside of the main envelope.

According to an embodiment, the at least one optical element may comprise at least one cylindrical (such as annular) portion arranged laterally around the optical axis of the at least one light source and having at least a portion with a thickness increasing towards the base. The cylindrical portion may e.g. laterally surround the light source such that light emitted from the light source in lateral directions is refracted by the optical element. The present embodiment is advantageous in that the ratio between the minimum thickness (which may be constituted by merely the envelope thickness) and the maximum thickness (which may be constituted by the sum of the envelope thickness and the maximum thickness of the optical element) of light transmissive material for the light emitted by the light source to pass is increased since the cylindrical portion may have an open end. Hence, light emitted forwardly may pass merely the envelope, while light emitted in lateral directions may pass both of the optical element and the envelope. The present embodiment is advantageous in that it enables having an increased variation in thickness, as the optical element may be released from the mold in direction away from the opening of the cylindrical optical element having the narrower thickness.

According to an embodiment, the at least one optical element may be shaped such that an outer surface of the optical element follows an inner surface of the envelope. For example, the optical element may be arranged adjacent (in close proximity) to the envelope. Thus, the outer shape of the optical element may match (or mate with) the inner shape of the portion of envelope facing the optical element. The present embodiment is advantageous in that the optical element is less visible from outside the envelope, as it may appear to be a part of the envelope.

According to an embodiment, the at least one optical element may comprise at least one prism-like shaped portion, such as a portion with a substantially triangular cross-section being tapered in a direction away from the base. For example, the optical element may comprise a cylindrical portion (as described above) having a substantially triangular cross-section, wherein the base of the triangular cross-section may be (directly or indirectly) coupled to the base. The cylindrical portion may then be referred to as having one or more prism-like shaped portions.

In an embodiment, the at least one optical element may comprise multiple portions having thicknesses increasing in direction towards the base and being arranged laterally beside the optical axis of the at least one light source so as to refract light emitted by the at least one light source for creating multiple virtual light sources spaced from the base. The present embodiment is advantageous in that it enables a higher degree of bending the light emitted by the light source, whereby the omnidirectional light spreading of the lighting device is improved. For example, the portions may be arranged beside each other in a radial direction of the lighting device. In the present specification, the radial direction may be the same as the lateral direction of the lighting device, such as any direction perpendicular to an optical axis of the lighting device. Hence, one portion with increasing thickness towards the base may be arranged outside the other. I.e., one such portion may be arranged between another portion with increasing thickness towards the base and the envelope. For example, the optical element may comprise several cylindrical portions having different diameters and being concentrically arranged. According to another example, the portions with increasing thickness towards the base may be arranged on top of each other in a direction along an optical axis of the at least one light source.

For example, the optical element may comprise a cylindrical portion having circumferentially extending ridges. For example, the multiple portions of the optical element may be multiple prism-like shaped portions.

According to an embodiment, the envelope and/or the optical element may be made of plastic, which is a relatively cheap and robust material, whereby manufacturing costs can be reduced. The envelope and the optical element may be injection molded separate from each other, which allows less complicated injection molding techniques to be used. Alternatively, the envelope and/or the optical element may be made of glass.

According to an embodiment, the at least one light source may be a solid state based light source, such as a light emitting diode (LED). The Lambertian-like light emission pattern of the solid state based light source may be redirected into a more omnidirectional light emission pattern by means of the optical element.

According to an embodiment, the envelope may be transparent (i.e. clear), whereby the virtual light source will be more clearly visible. Alternatively, the envelope may be translucent (i.e. diffuse).

According to an embodiment, the envelope may have a dome-like (or bulb-like) shape, preferably enclosing the light source and the optical element.

According to an embodiment, an area in proximity to the at least one light source may be white, black and/or specularly reflective. Such an area may e.g. be an area of the base and/or an area of a circuit board to which the light source is coupled. Such an area may be visible by means of the light refracting effect provided by the optical element, in particular when the light source is off. With the present embodiment, such an area may be visually perceived as more neutral. In case the area is white or reflective, it is more visually fused with the light source in the virtual image created by the optical element. In case the area in proximity to the at least one light source is black, it has low reflectivity, which increases the contrast of the virtual light source with respect to its surroundings.

It is noted that embodiments of the invention relates to all possible combinations of features recited in the claims.

BRIEF DESCRIPTION OF THE DRAWINGS

This and other aspects will now be described in more detail with reference to the appended drawings showing embodiments.

FIG. 6 is illustrates the light intensity distribution of a lighting device according to an embodiment.

FIG. 7 is illustrates the light intensity distribution of a prior art lighting device.

All the figures are schematic, not necessarily to scale, and generally only show parts which are necessary in order to elucidate the embodiments, wherein other parts may be omitted or merely suggested. Like reference numerals refer to like elements throughout the description.

DETAILED DESCRIPTION

The present aspect will now be described more fully hereinafter with reference to the accompanying drawings, in which currently preferred embodiments are shown. This invention may, however, be embodied in many different forms and should not be construed as limited to the embodiments set forth herein; rather, these embodiments are provided for thoroughness and completeness, and fully convey the scope of the present aspect to the skilled person.

Figure 1:
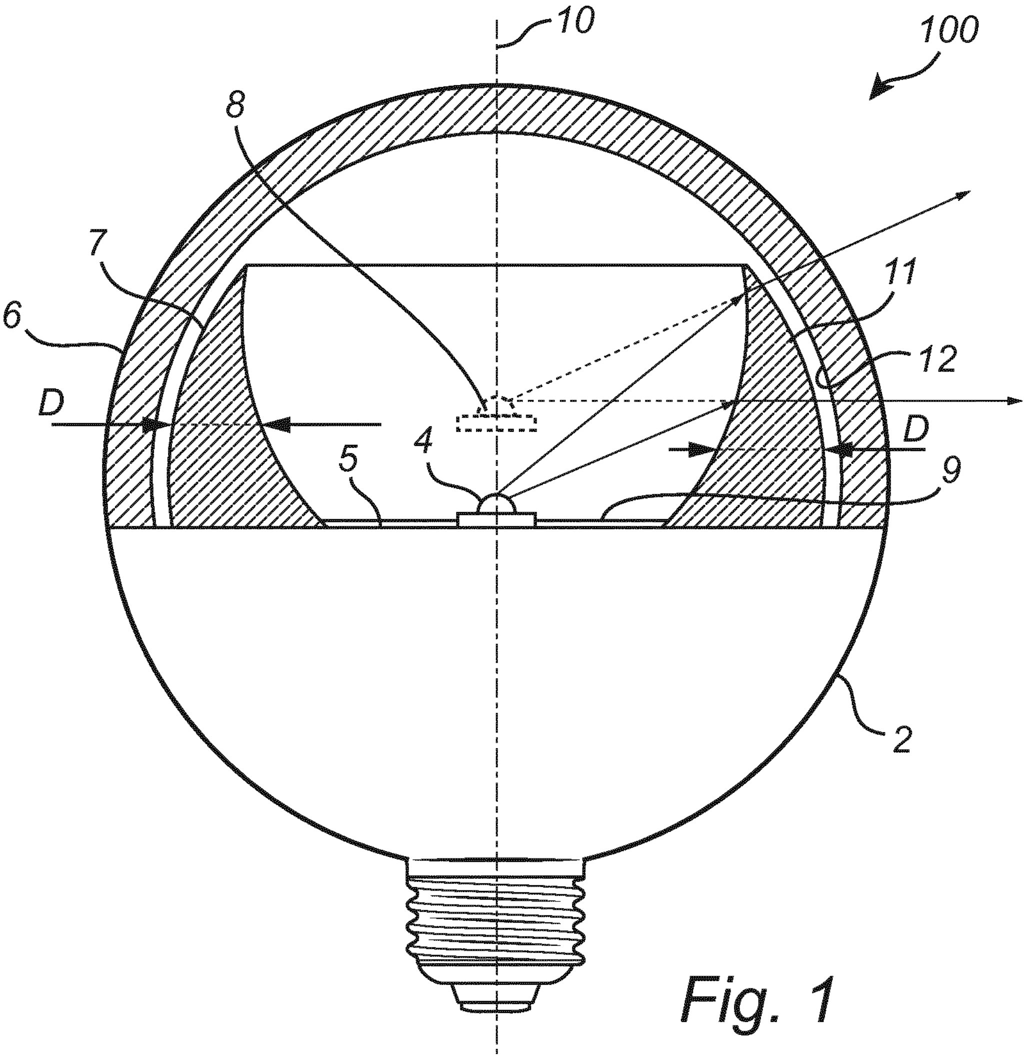
FIG. 1 shows a lighting device according to an embodiment.

A lighting device according to an embodiment will be described with reference to FIG. 1. FIG. 1 is a cross-section of a lighting device 100 comprising a base 5, a light source 4 (directly or indirectly) coupled to the base 5 and an envelope (or cover) 6 arranged to cover the light source 4. The envelope 6 may be light transmissive, such as transparent, and may preferably be (directly or indirectly) coupled to the base 5. The envelope 6 may e.g. be shaped as a dome (or bulb). The base 5 and the envelope 6 may together enclose the light source 4. The light source 4 may e.g. be a solid state based light source, such as a light emitting diode (LED). The envelope 6 may have a uniform thickness. For example, the envelope 6 may be a standard plastic (such as polycarbonate, PC) envelope. The dome-shape of the envelope 6 enables manufacturing of the envelope 6 by using standard injection molding techniques without leaving any visible joints on the outside of the envelope 6.

The lighting device 100 may further comprise a heat sink 2 arranged to dissipate heat generated by the light source 1 and preferably also heat generated by the driver (not shown) for driving the light source 4. The heat sink 2 may be arranged at the base 5. In the present example, the base 5 forms a support surface for the light source 4 at the heat sink 2. The light source 4 may be coupled to a circuit board (not shown), such as a printed circuit board (PCB), which in turn may be coupled to the base 5. The area 9 of the base 5, and/or the circuit board, located in proximity to the light source 4, such as the area 9 within at least a few millimeters from the light source 4, may preferably be reflective. For example, a reflective layer, coating or element may be applied to the base 5 and/or the circuit board. Preferably, the area 9 may be specularly reflective. Alternatively, the area 9 may be white (i.e. diffusely reflective).

The lighting device 100 further comprises a light transmissive (such as translucent or transparent) optical element 7 separate from the envelope 6 and arranged to refract light emitted by the light source 4. The optical element 7 may be (directly or indirectly) coupled to the base 5 and may be arranged beside and/or to extend around the light source 4 so as to refract light emitted in lateral directions from the light source 4. The optical element 7 may have a portion having a cross-section with a thickness D (preferably continuously, but not necessarily linearly) increasing in direction towards the base 5. Hence, at least a portion of the optical element 7 having a thickness increasing towards the base 5 is located laterally beside an optical axis 10 of the light source 4. In the present example illustrated in FIG. 1, the optical element 7 has a cylindrical shape with a thickness increasing towards the base 5. Hence, the optical element 7 may be seen as having several portions with a thicknesses increasing towards the base 5 extending circumferentially around the light source 4 (in a cylindrical shape), whereby each portion is arranged laterally beside the optical axis 10 of the light source 4. Preferably, the axis of the cylinder-shaped optical element 7 may coincide with the optical axis 10 of the lighting device 100. The shape of the optical element 7 according to the present example may be referred to as a prism-like shape, as the inner and outer surface of the optical element 7 form an angle to each other (which not necessarily needs to be constant). The prism-like shape of the optical element 7 may extend as a ridge around the light source 4. Further, the shape of an outer surface 11 of the optical element 7 may follow the shape of an inner shape 12 of the envelope 6, whereby close fitting of the optical element 7 and the envelope 6 is enabled, as illustrated in FIG. 1. In the present example, the inner and outer surface of the optical element 7 may be curved. Alternatively, merely one, or none of the inner and outer surface of the optical element 7 may be curved. The optical element 7 may be manufactured (such as molded) separate from the envelope.

In the following, operation of the lighting device 100 will be described, still with reference to FIG. 1. Light emitted by the light source 4 towards the optical element 7 (i.e. mainly in lateral directions) is refracted by the optical element 7 in a direction away from the optical axis of the lighting device (i.e. more backwardly), which in the present example coincide with the optical axis 10 of the light source 4. Due to its varying thickness D, the optical element 7 may act as a negative lens and a virtual light source 8 spaced from the real light source 4 will be visible. As the virtual light source 8 is located higher above the base 5 than the real light source 4, it will provide higher light intensity in backward directions, as the shadowing effect of the base 5 is reduced. A greater variation in the sum of the thickness of the envelope 6 and the optical element 7 is rendered possible while still enabling use of standard injection molding techniques since the envelope 6 and optical element 7 are separate components, which may be manufactured separately. Hence, the shape of each one of the envelope 6 and the optical element 7 may allow facilitated separation of the molds.

Several different shapes of the optical element 7 having at least a portion with a thickness increasing towards the base 5 may be envisaged for providing the light refracting effect for creating the virtual light source 8, some of which will be described in the following. The lighting devices described in the following may be similarly configured as the lighting device described with reference to FIG. 1, but may have a slightly differently configured optical element.

Figure 2:
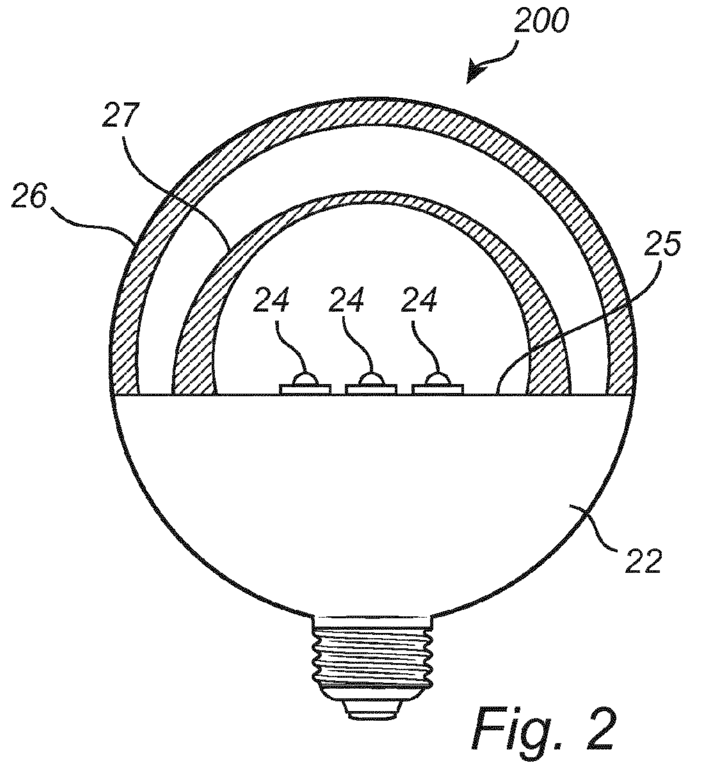
FIG. 2 shows a lighting device according to another embodiment.

FIG. 2 shows a lighting device 200 according another embodiment. In the present example, the lighting device 200 comprises a plurality of light source 24, such as a 3×3 matrix of LEDs. Having several light sources 24 instead of merely one is advantageous in that it provides a more uniform light spreading since peaks in the light distribution due to Fresnel reflections in the optical element and the envelope 26 may be reduced. In the present example, the optical element is formed as an additional envelope 27 covering the light sources 24 and arranged inside the envelope 26. The additional envelope 27 may have a thickness increasing towards the base 25. Hence, the upper portion of the additional envelope 27 may be thinner than the lower portion of the additional envelope 27. The additional envelope 26 may be spaced from, or located in close proximity to the (outer) envelope 26.

Figure 3:
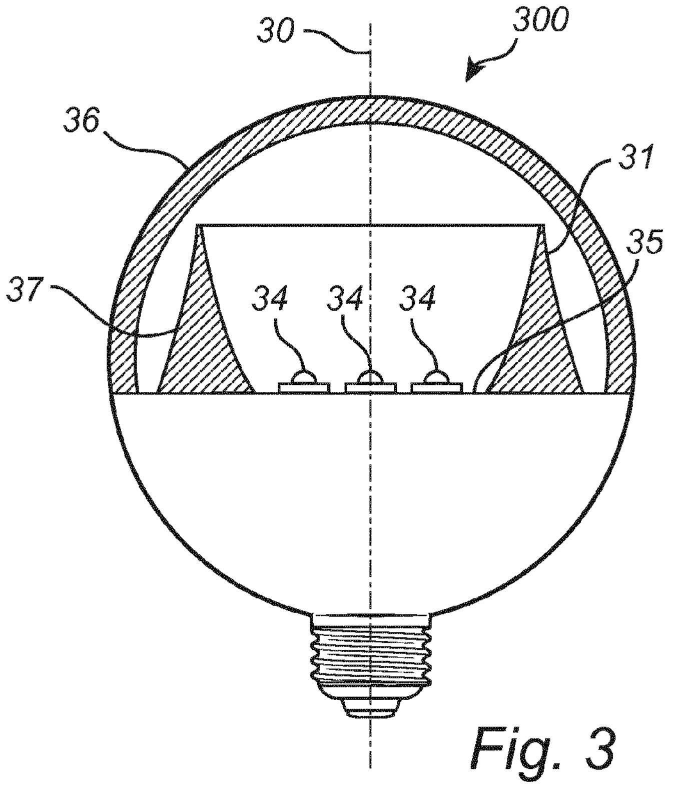
FIG. 3 shows a lighting device according to yet another embodiment.

FIG. 3 shows a lighting device 300 according yet another embodiment. In the present example, the optical element 37 may be cylindrical and may have a prism-like shape, whereby the thickness of the cross-section of the optical element 37 increases in direction towards the base 35. The cylindrical optical element 37 may be arranged to laterally surround the light sources 34, such that each portion of the optical element 37 is located laterally beside the optical axis 30 of the light sources 34. In the present example, the shape of the outer surface 31 of the optical element 37 does not follow the shape of inner surface 32 of the envelope 36, in contrast to the optical element described with reference to FIG. 1.

Figure 4:
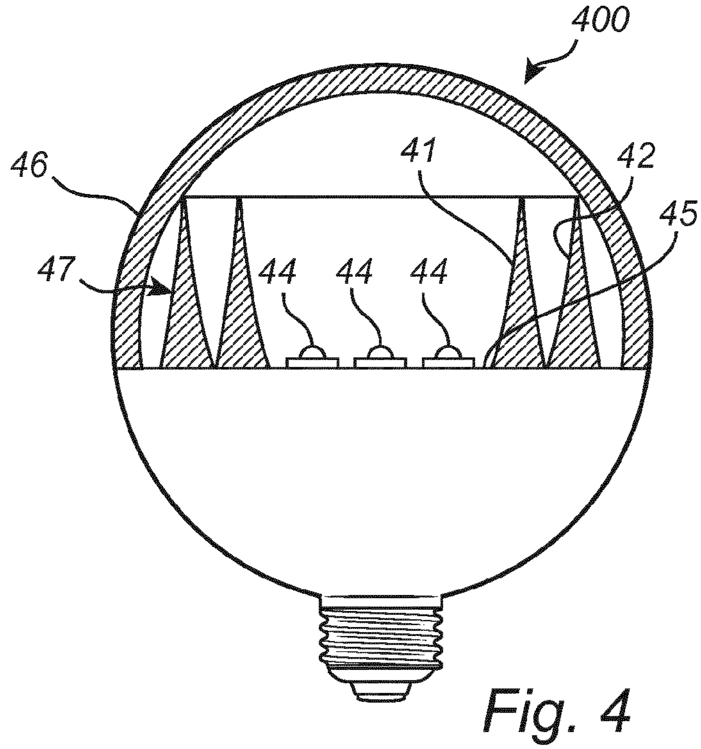
FIG. 4 shows a lighting device according to yet another embodiment.

FIG. 4 shows a lighting device 400 according yet another embodiment. In the present example, the optical element 47 may comprise an inner cylindrical portion 41 arranged around the light sources 44, and an outer cylindrical portion 42 arranged around the inner cylindrical portion 41. Each cylindrical portion 41, 42 may have a prism-like shape, whereby the thickness of the cross-section of each cylindrical portion 41, 42 increases in direction towards the base 45. In other words, the prism-like shaped portions 41, 42 (formed by the cylindrical portions) of the optical element 47 are arranged beside each other in a radial direction of the lighting device 400.

Figure 5:
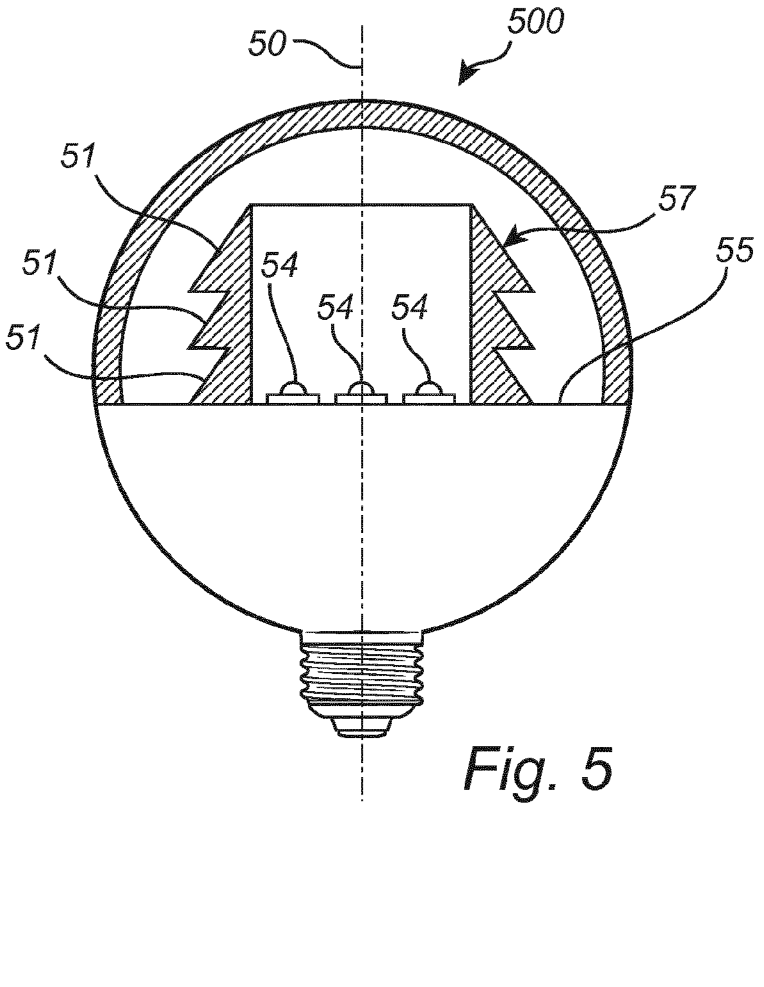
FIG. 5 shows a lighting device according to yet another embodiment.

FIG. 5 shows a lighting device 500 according yet another embodiment. In the present example, the optical element 57 may be cylindrical and may have a plurality of prism-like shaped portions 51 arranged on top of each other in a direction along an optical axis 50 of the lighting device 500. Hence, each prism-like shaped portion 51 may have a thickness increasing in direction towards the base 55. The prism-like shaped portions 51 may extend like ridges circumferentially along the outside of the cylindrical optical element 57. The cylindrical optical element 57 may be arranged around the light sources 54.

FIG. 6 shows a diagram illustrating the light intensity distribution of a lighting device according to an embodiment and FIG. 7 shows a diagram illustrating the light intensity distribution of a prior art lighting device. When comparing FIGS. 6 and 7, it can be seen that the light spreading of the lighting device according to the embodiment is wider than the light spreading of the prior art lighting device. Hence, the intensity in lateral and backward directions of is higher of the lighting device according to the embodiment compared to the prior art lighting device. The peak in the middle of the curve shown in FIG. 6 is caused by Fresnel reflections in the optical element and the envelope. Such Fresnel peaks may be reduced by having several light sources instead of merely one.

Figure 8:
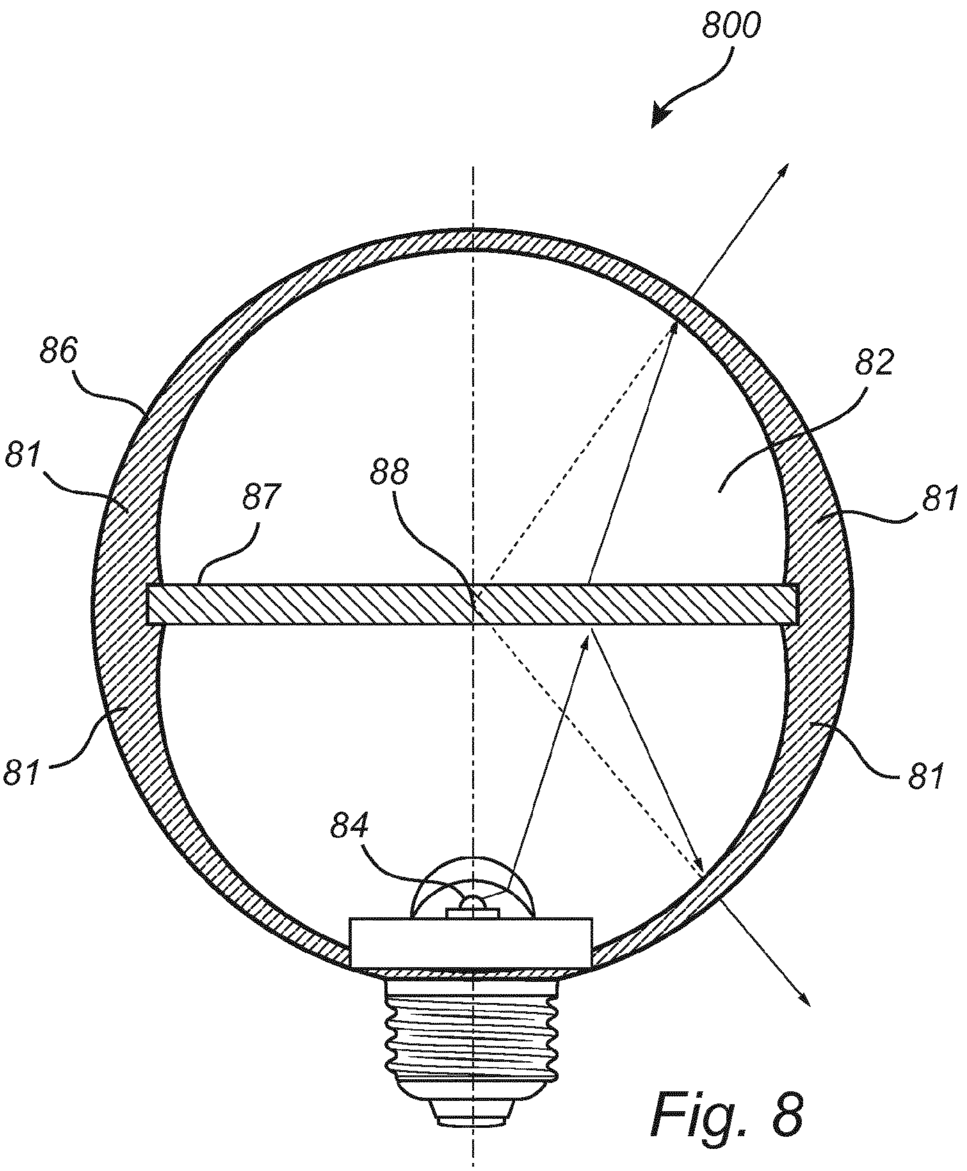
FIG. 8 shows a lighting device according to another inventive concept.

According to another inventive concept, a lighting device is provided. An embodiment of the present inventive concept is shown in FIG. 8. The lighting device 800 comprises at least one light source 84, a light transmissive envelope 86 defining a compartment 82 for covering the at least one light source 84, and a semitransparent reflective element 87 coupled to the envelope 86 and extending through the compartment 82, wherein the envelope 86 has at least a portion 81 having a thickness increasing towards the semitransparent reflective element 87, and wherein the semitransparent reflective element 87 and said portion 81 of the envelope 86 are arranged such that light emitted by the at least one light source is reflected and refracted so as to create at least one virtual light source located at the position 88 of the semitransparent reflective element 87.

With the present inventive concept, a first portion of the light emitted by the light source 84 may first be reflected by the semitransparent reflective element 87 and then refracted by the portion 81 of the envelope 86 with a thickness increasing towards the semi-reflective element 87 in a direction more towards the main forward emission direction of the lighting device 800. Further, a second portion of the light emitted by the light source 84 may first be transmitted by the semitransparent reflective element 87 and then refracted by the portion 81 of the envelope 86 with a thickness increasing towards the semi-reflective element 87 in a direction more towards the backward direction of the lighting device 8. Consequently, a virtual image may be created at the position 88 of the semitransparent reflective element 87. Hence, the portions 81 of the envelope 86 with a thickness increasing towards the semitransparent reflective element 87 (such as towards the attachment points of the semitransparent reflective element 87 to the envelope 86) may act as a lens arrangement having a focus at the position of the semitransparent reflective element 87 for creating a virtual image of the light source spaced from the light source 84, whereby the omnidirectional light spreading of the lighting device 8 is improved.

The light source 84 may be arranged inside the compartment 82 defined by the envelope 86. The semitransparent reflective element 87 may be arranged above the light source 84 so as to divide the compartment 82 into two sub-compartments located on top of each other. The envelope 86 may e.g. be bulb-shaped.

It will be appreciated that the semitransparent reflective element 87 may have at least a portion (preferably a major portion) being both reflective and light transmissive. For example, the semitransparent reflective element 87 may comprise a transparent substrate with a metallic (such as silver or aluminum) reflective layer applied thereon. The metallic layer may e.g. be sufficiently thin to admit some light. Alternatively or additionally, the metallic layer may be patterned, such as perforated, (i.e. comprise through holes) for admitting some of the light emitted by the light source 84. The pattern (or the perforations) may be sufficiently fine for reducing shadows. Alternatively, the envelope 86 may be diffuse so as to reduce shadows from the patter or perforations. According to another example, the semitransparent reflective element 87 may comprise grooves (preferably radially extending grooves) arranged to reflect some of the light by means of total internal reflection (TIR). Optionally, the portion of the semitransparent reflective element 87 located right above the light source 84 may be diffusely transmissive and diffusely reflective since this portion is positioned at the location of virtual light source.

The person skilled in the art realizes that the present invention by no means is limited to the preferred embodiments described above. On the contrary, many modifications and variations are possible within the scope of the appended claims. For example, the optical element may not necessarily be cylindrical or bulb-shaped, but may alternatively be divided into several separate parts arranged to refract light emitted by the light source for providing a virtual light source.

Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A lighting device comprising: a base, at least one light source having an optical axis and being arranged at the base, at least one light transmissive optical element, and a light transmissive envelope arranged to cover the at least one light source and the at least one optical element, wherein the at least one optical element comprises multiple portions having thicknesses increasing in a direction towards the base and being arranged laterally beside the optical axis of the at least one light source so as to refract light emitted by the at least one light source for creating multiple virtual light sources spaced from the base, the multiple portions are arranged beside each other in a radial direction of the lighting device.

2. The lighting device as defined in claim 1, wherein the at least one optical element and the envelope are separate parts.

3. The lighting device as defined in claim 1, wherein the at least one optical element is coupled to the base and extends in a direction away from the base.

4. The lighting device as defined in claim 1, wherein the envelope has a uniform thickness.

5. The lighting device as defined in claim 1, wherein the thickness of said portion of the at least one optical element increases continuously towards the base.

6. The lighting device as defined in claim 1, wherein the at least one optical element comprises an additional envelope arranged to cover the at least one light source and having a thickness increasing in direction towards the base.

7. The lighting device as defined in claim 1, wherein the at least one optical element comprises at least one cylindrical portion arranged laterally around the optical axis of the at least one light source and having at least a portion with a thickness increasing towards the base.

8. The lighting device as defined in claim 1, wherein the at least one optical element is shaped such that an outer surface of the optical element follows an inner surface of the envelope.

9. The lighting device as defined in claim 1, wherein the at least one optical element comprises at least one prism-like shaped portion.

10. The lighting device as defined in claim 1, wherein the at least one light source is a solid state based light source.

11. The lighting device as defined in claim 1, wherein an area in proximity to the at least one light source is white, black and/or specularly reflective.

* * * * *